(12) United States Patent
Tseng et al.

(10) Patent No.: US 12,141,721 B2
(45) Date of Patent: Nov. 12, 2024

(54) VEHICLE CHARGE INTENT PREDICTION AND RECOMMENDATION SYSTEMS AND METHODS

(71) Applicant: Ford Global Technologies, LLC, Dearborn, MI (US)

(72) Inventors: Fling Finn Tseng, Ann Arbor, MI (US); Kwaku O. Prakah-Asante, Commerce Township, MI (US); Swati Rawat, Brampton (CA); Kalyani Purushottam Sonawane, Plymouth, MI (US); Himanshu Verma, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 6 days.

(21) Appl. No.: 18/173,204

(22) Filed: Feb. 23, 2023

(65) Prior Publication Data
US 2024/0289700 A1    Aug. 29, 2024

(51) Int. Cl.
*G06Q 10/02* (2012.01)
(52) U.S. Cl.
CPC .................................... *G06Q 10/02* (2013.01)
(58) Field of Classification Search
CPC ...................................................... G06Q 10/02
See application file for complete search history.

(56) References Cited

U.S. PATENT DOCUMENTS

| | | | |
|---|---|---|---|
| 10,118,499 B2 * | 11/2018 | Naghshtabrizi | B60L 15/20 |
| 2013/0257145 A1 * | 10/2013 | Caldeira | B60L 50/61 |
| | | | 307/9.1 |
| 2014/0129139 A1 | 5/2014 | Ellison et al. | |
| 2017/0074677 A1 | 3/2017 | Macneille et al. | |
| 2017/0168493 A1 | 6/2017 | Miller et al. | |
| 2019/0226860 A1 * | 7/2019 | Fisher | B60L 53/66 |
| 2019/0299802 A1 * | 10/2019 | Neubecker | H02J 7/0044 |
| 2020/0217679 A1 | 7/2020 | DeLuca et al. | |
| 2021/0300191 A1 * | 9/2021 | Sakakibara | B60L 58/13 |

(Continued)

OTHER PUBLICATIONS

Dukpa, Andu, and Butrylo, Boguslaw, "MILP-Based Profit Maximization of Electric Vehicle Charging Station Based on Solar and EV Arrival Forecasts," Energies, 15, 5760, Aug. 8, 2022.*

(Continued)

*Primary Examiner* — Nathan Erb
(74) *Attorney, Agent, or Firm* — Emily Drake; Eversheds Sutherland (US) LLP

(57) ABSTRACT

A vehicle charging management method is disclosed. The method may include obtaining a first input associated with a vehicle. The first input may include a state of charge (SOC) level of a vehicle battery, a distance travelled by the vehicle since last charge, and time since the last charge. The method may further include obtaining a second input associated with historical vehicle battery charging information. Responsive to obtaining the first input and the second input, the method may include determining a vehicle user intent to charge the vehicle battery. The method may further include comparing the vehicle user intent with a threshold value, and transmitting a notification to a communication device when the vehicle user intent is greater than the threshold value.

13 Claims, 4 Drawing Sheets

(56) References Cited

U.S. PATENT DOCUMENTS

2022/0185135 A1* 6/2022 Langton .................. B60L 58/12
2023/0406140 A1* 12/2023 Gross ................. G06Q 30/0645

OTHER PUBLICATIONS

Zhiyong Tian et al., Real-Time Charging Station Recommendation System for Electric-Vehicle Taxis, IEEE Transactions on Intelligent Transportation Systems, Apr. 14, 2016, 1-12.
Yue Cao et al., A Decentralized Deadline-Driven Electric Vehicle Charging Recommendation, IEEE Systems Journal, Jul. 17, 2018. 2-12.

* cited by examiner

VEHICLE CHARGE INTENT PREDICTION AND RECOMMENDATION SYSTEMS AND METHODS

FIELD

The present disclosure relates to vehicle charging management systems and methods and more particularly to systems and methods to predict a user charge intent and recommend a charger based on user charging behavior.

BACKGROUND

An Electric Vehicle (EV) operates on electric energy and a vehicle user is required to charge vehicle battery regularly to ensure uninterrupted vehicle operation. The user generally tracks battery's State of Charge (SOC) level and charges the battery when the SOC level decreases beyond a level. The battery SOC level generally decreases as the vehicle user operates or drives the vehicle. The SOC level may also decrease if the vehicle is left unattended (i.e., when the vehicle is not operated) over a time duration.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
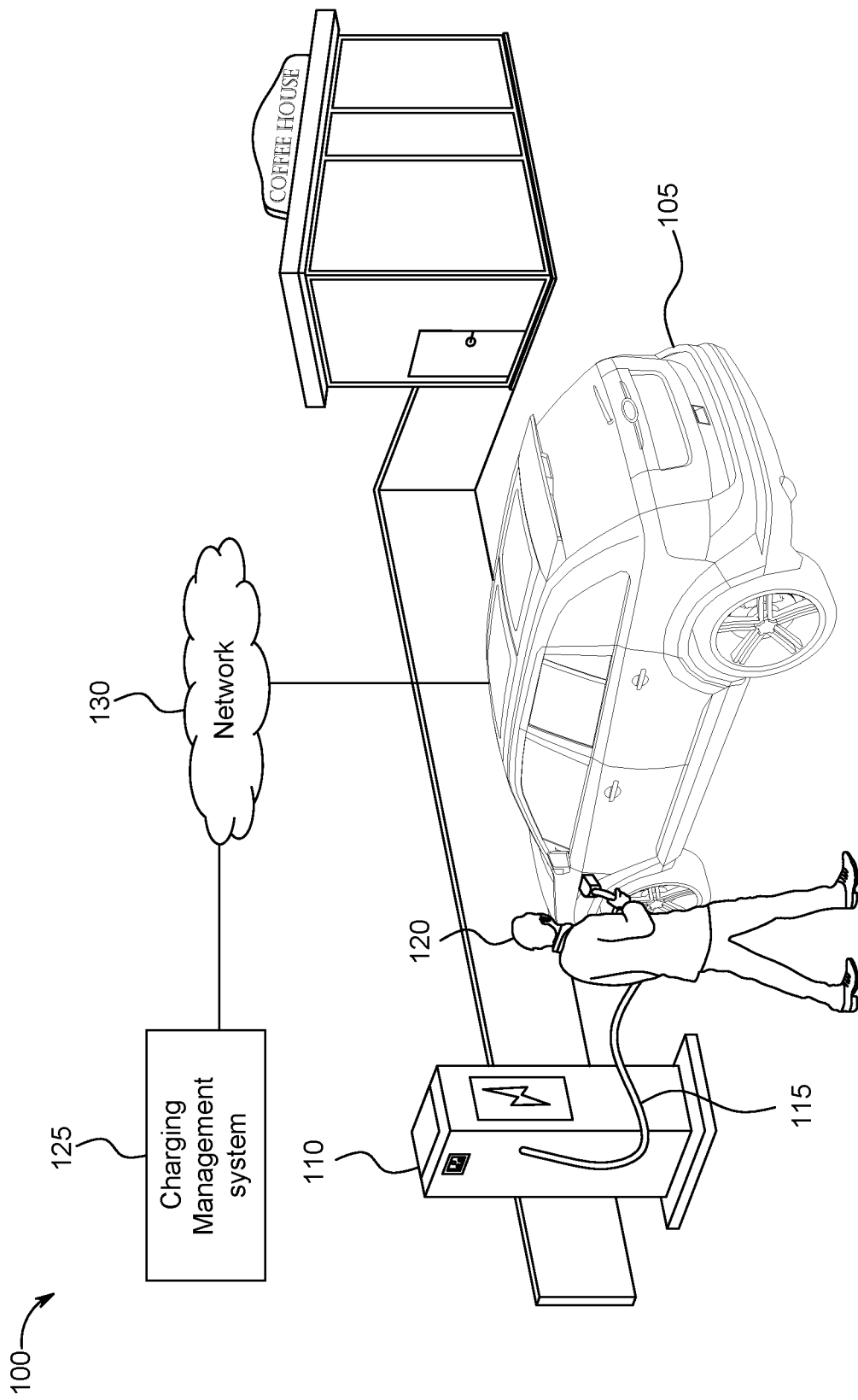
FIG. 1 depicts an example environment in which techniques and structures for providing the systems and methods disclosed herein may be implemented.

The present disclosure describes a vehicle charging management system that may predict a user intent to charge a vehicle battery and may remind the user to charge the battery when the user intent is greater than a threshold. The system may determine the user intent based on vehicle operational status and user's historical battery charging pattern. The vehicle operational status may include, for example, a battery state of charge (SOC) level, a distance travelled by the vehicle since last charge, and a time elapsed since the last charge. The historical battery charging pattern may include, for example, information associated with a user-preferred SOC level at which the user generally charges the battery, a user-preferred distance between two charging events, and a user-preferred time between two charging events.

In some aspects, the system may calculate separate/independent user intents associated with each of the SOC level, the distance travelled by the vehicle since the last charge, and the time elapsed since the last charge. The system may calculate each user intent by comparing the current SOC level, the distance travelled and the time elapsed with the respective user-preferred values of SOC level, distance travelled and time elapsed. In an exemplary aspect, each user intent may be calculated as a ratio (or percentage) of current values of the SOC level, the distance and the time, with the respective user-preferred values.

The system may predict a "final" user intent to charge the battery by determining a maximum user intent from the user intents associated with the SOC level, the distance travelled, and the time elapsed. For example, if the user intent associated with the SOC level is 75%, the distance travelled is 40% and the time elapsed is 60%, the system may determine the final user intent to charge the battery as 75%. The system may compare the final user intent with the threshold value, and may send a notification to the user (e.g., via a user device or vehicle infotainment system) confirming whether the user is interested in charging the vehicle battery. In some aspects, with time, the system may determine an optimal way to aggregate the independent user intents associated with the SOC level, the distance travelled, and the time elapsed, and predict the final user intent based on the aggregated independent user intents. For example, in some aspects, the system may predict the final user intent by calculating a weighted sum of independent user intents.

The system may further obtain vehicle user historical driving pattern that may include driving routes, daily activities and schedules, destination locations (that may be different for different times of the day or week), and/or the like. In addition, the system may obtain other charging station usage pattern including day and time to charge the vehicle, preferred charging locations, etc. The system may further correlate the vehicle user historical driving pattern and the other charging station usage pattern with the independent user intents (associated with the SOC level, the distance travelled, and the time elapsed), and determine the final user intent. For example, the system may calculate different independent user intents at different times of the day or days of the week, based on vehicle user historical driving pattern and the other charging station usage pattern.

The system may be further configured to identify a charging station that the user may use to charge the battery, when the user confirms that the user is interested in charging the battery. The system may further navigate the vehicle to the identified charging station.

In further aspects, the system may send the notification to the user to charge the vehicle battery when the system determines that the user is in proximity to a user-preferred charging station (even if the final user intent is less than the threshold value).

The present disclosure discloses a vehicle charging management system that "reminds" the user to charge the vehicle battery based on current vehicle operational status and user's historical battery charging pattern. Therefore, the user is not required to track the battery SOC level as the system automatically sends the reminder when the system determines that the user may desire to charge the battery. Further, the system recommends the charge station where the user may charge the vehicle battery. Thus, the user is not required to manually search for charging station locations.

These and other advantages of the present disclosure are provided in detail herein.

ILLUSTRATIVE EMBODIMENTS

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 105 that may be a battery electric vehicle (BEV). The vehicle 105 may take the form of any passenger or commercial vehicle such as, for example, an off-road vehicle, a car, a crossover vehicle, a van, a minivan, a bus, a truck, etc. Further, the vehicle 105 may be a manually driven vehicle and/or may be configured to operate in partially or fully autonomous mode. In further aspects, the vehicle 105 may be a plug-in hybrid electric vehicle (PHEV). When the vehicle 105 is PHEV, the vehicle 105 may be equipped with an internal combustion engine that can be employed either alone or in combination with other energy sources to propel the vehicle 105.

The vehicle 105 may include a traction battery or battery pack (not shown) that may provide energy for vehicle propulsion. The battery may be charged by an external power source 110. The external power source 110 may be a charging point (hereinafter referred to as charging station 110). The charging station 110 may include a connecting device 115 that may connect the charging station 110 and the vehicle 105. The connecting device 115 may include a cable and a cable connector that may be inserted in the vehicle 105 for charging. In particular, when a vehicle user 120 desires to charge the vehicle 105, the vehicle user 120 may insert the cable connector in the vehicle 105.

In some aspects, the charging station 110 may be private such as those at homes and businesses. In other aspects, the charging station 110 may be publicly available electrified vehicle charging station. The charging station 110 may be configured to supply alternating current (AC) power or supply direct current (DC) power. The DC power may enable fast charging of vehicle battery. Stated another way, the DC power may provide sufficient charge to the vehicle battery in relatively short time duration (e.g., 50% in 10-15 minutes). In some aspects, the vehicle 105 may include power converters such as AC to DC converter, DC to DC converter, etc. A person ordinarily skilled in the art may appreciate that the AC to DC converter may be used to convert AC power from the charging station 110 to DC power that may be supplied to the vehicle battery. Further, the DC-to-DC converter may be used to convert a first DC voltage to a second DC voltage for different vehicle functions.

A battery state of charge (SOC) level may increase when the vehicle user 120 connects the connecting device 115 to the vehicle 105. The SOC level may provide an indication associated with battery charging state. Specifically, the SOC level may indicate a level of battery charge relative to battery's capacity. The rate of change in the SOC level may be based on the charger type and time for which the power is supplied to the vehicle 105. In some aspects, the SOC level may decrease when the vehicle 105 travels (e.g., when the vehicle user 102 drives the vehicle 105) or over a time duration, even if the vehicle 105 is stationary and/or left unattended.

The environment 100 may further include a charging management system 125 that may be connected to the vehicle 105 via one or more networks 130. The network(s) 130 illustrates an example communication infrastructure in which the connected devices discussed in various embodiments of this disclosure may communicate. The network(s) 130 may be and/or include the Internet, a private network, public network or other configuration that operates using any one or more known communication protocols such as, for example, transmission control protocol/Internet protocol (TCP/IP), Bluetooth®, BLER, Wi-Fi based on the Institute of Electrical and Electronics Engineers (IEEE) standard 802.11, UWB, and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 105 may be configured to transmit information associated with the battery SOC level to the charging management system 125. For example, the vehicle 105 may transmit the SOC level (before and/or after the charging operation) to the charging management system 125. Stated another way, the charging management system 125 may obtain SOC level information (as a "first input") from the vehicle 105. In addition, the charging management system 125 may receive additional vehicle information (as a "second input") from the vehicle 105. The additional vehicle information may include, but is not limited to, a distance travelled by the vehicle 105 since last charge, time elapsed since the last charge, a battery type, a vehicle type, and/or the like.

In some aspects, the charging management system 125 may receive the first input and the second input from the vehicle 105 at a predefined frequency, e.g., every 100 milliseconds or 1-5 seconds.

The charging management system 125 may additionally obtain user 120 historical vehicle battery charging information from a vehicle 105 memory (or a server). The historical vehicle battery charging information may include last battery charge time/day, SOC level at which the vehicle 105 was last charged, time for which the battery was last charged (e.g., 30 minutes or 15 minutes), charger type used (e.g., fast charger or regular charger), etc. In some aspects, the charging management system 125 may obtain vehicle battery charging information at a predefined frequency (e.g., once or twice in a day) or at every charging event so that the charging management system 125 may "extract" or "identify" the user 120 historical vehicle battery charging information. For example, the charging management system 125 may obtain the vehicle battery charging information between charging events, and not only when the vehicle battery is charged. The charging management system 125 may obtain the user 120 historical vehicle battery charging information one-by-one or simultaneously.

In some aspects, the charging management system 125 may determine user 120 charging behavior pattern (or "user preferences") based on the historical vehicle battery charging information. The user 120 charging behavior pattern may include a user preferred SOC level at which the user 120 may generally prefer to charge the vehicle 105, a user preferred distance travelled between charging events, and a user preferred time since last charge at which the user 120 may prefer to charge the vehicle 105. For example, the user 120 may prefer to charge the vehicle 105 at an SOC level of 25%, when the vehicle 105 has travelled over 200 miles since the last charge, or after 48 hours since the last charge.

The user 120 charging behavior pattern may further include user preferences associated with a charger type, day and time to charge the vehicle 105, or charging station locations. The charging management system 125 may store the user 120 charging behavior pattern in the vehicle 105 memory.

The charging management system 125 may further determine/predict a vehicle user intent to charge the vehicle 105 based on the obtained first input, the second input, and the user 120 charging behavior pattern. For example, the charging management system 125 may predict that the user intent to charge the vehicle 105 may be high when the current SOC level (as obtained in the first input) is 25% and the user preferred SOC level is also 25%. As another example, the charging management system 125 may predict that the user intent to charge the vehicle 105 may be high when the vehicle 105 has travelled 200 miles (as obtained in the second input) and the user preferred distance travelled between charging events is also 200 miles.

Responsive to predicting the vehicle user intent, the charging management system 125 may provide recommendation or notification to the user 120 to charge the vehicle 105. In addition to providing the notification to the user 120, the charging management system 125 may search for and identify charger locations to recommend to the user 120. Triggering the searching for the charger locations in response to predicting the vehicle user intent may improve system processing time and responsiveness. In some aspects, to identify the charger locations to recommend, the charging management system 125 may obtain information associated with a plurality of charging stations from the server (or any other device). For example, the charging management system 125 may obtain locations of the plurality of charging stations in a geographical area where the vehicle 105 may be located or may travel, real-time charging station availability, charger type (fast charger or regular charger) available at each charging station, and/or the like. The charging management system 125 may provide recommendation for charging the vehicle 105 using a specific charging station based on the information associated with a plurality of charging stations.

In this manner, the user 120 may not be required to track the SOC level, and the charging management system 125 may automatically "remind" the user 120 to charge the vehicle 105 when the predicted user intent is high. In addition, the user 120 may not be required to search for an available preferred charger manually as the charging management system 125 may automatically search for the available charger, and communicate to the user 120. In some aspects, the charging management system 125 may display search results when the user 120 uses a user interface (such as vehicle infotainment system or user device).

Figure 2:
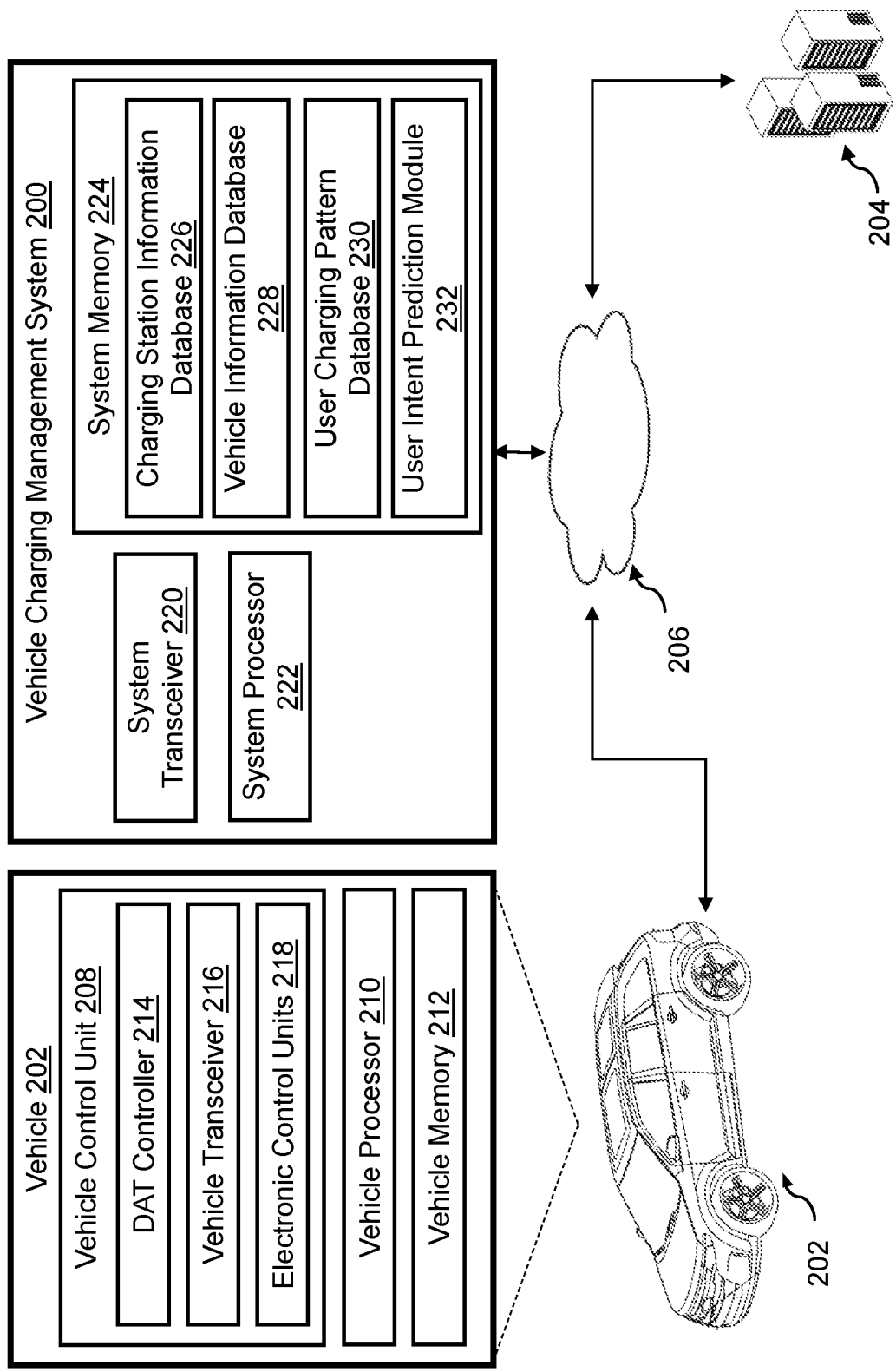
FIG. 2 depicts a block diagram of an example vehicle charging management system in accordance with the present disclosure.

The details of the charging management system 125 may be understood in conjunction with FIG. 2.

FIG. 2 depicts a block diagram of an example vehicle charging management system 200 in accordance with the present disclosure. The vehicle charging management system 200 may be same as the charging management system 125. The vehicle charging management system 200, as described herein, can be implemented in hardware, software (e.g., firmware), or a combination thereof.

The vehicle charging management system 200 may be connected with a vehicle 202 and an external server 204 via a network 206. The network 206 may be same as the network 130. In some aspects, the vehicle charging management system 200 may be a part of the vehicle 202. In other aspects, the vehicle charging management system 200 may be a part of the server 204.

The vehicle 202 may be same as the vehicle 105. In some aspects, the vehicle 202 may be include a Battery EV (BEV) driving system or may be configured as an electric vehicle (EV). More particularly, the vehicle 202 may include a battery EV (BEV) drive system, or be configured as a hybrid EV (HEV) having an independent onboard powerplant, a plug-in HEV (PHEV) that includes an HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicle 202 may be further configured as a fuel cell vehicle (FCV) that converts liquid or solid fuel to usable power using a fuel cell (e.g., a hydrogen fuel cell vehicle (HFCV) powertrain, etc.) and/or any combination of these drive systems and components.

In some aspects, the vehicle 202 may be a manually driven vehicle and/or be configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4.

The vehicle 202 may include a plurality of units including, but not limited to, a vehicle control unit (VCU) 208, one or more vehicle processors 210 (or a vehicle processor 210) and a vehicle memory 212 (that may be part of an on-board vehicle computer, not shown), communicatively connected with each other.

The vehicle processor 210 may be disposed in communication with one or more memory devices (e.g., the vehicle memory 212 and/or one or more external databases not shown in FIG. 2). The vehicle processor 210 may utilize the vehicle memory 212 to store programs in code and/or to store data for performing various vehicle 202 operations in accordance with the present disclosure. The vehicle memory 212 may be a non-transitory computer-readable memory. The vehicle memory 212 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The VCU 208 may include a plurality of units including, but not limited to, a Driver Assistance Technologies (DAT) controller 214, a vehicle transceiver 216, a plurality of electronic control units (ECUs) 218, and the like. In some aspects, the vehicle transceiver 216 may be outside the VCU 208. The VCU 208 may be configured and/or programmed to coordinate data within vehicle units, connected computing devices (e.g., the server 204) and the vehicle charging management system 200.

The DAT controller 214 may provide Level-1 through Level-4 automated driving and driver assistance functionality to a vehicle 202 operator. One or more ECUs 218 may be configured to determine vehicle operational status including, but not limited to, a vehicle 202 battery health status (such as information associated with a current vehicle battery discharge rate, battery degradation over time and the like), a current battery temperature, a battery state of charging (SOC) level, a distance travelled by the vehicle 202 since last charge, time for which the battery was last charged (e.g., 30 minutes or 15 minutes), last battery charge time/day (or time elapsed since last charge), SOC level at which the vehicle 202 was last charged, charger type used (e.g., fast charger or regular charger), etc. For example, the ECUs 218 may obtain information associated with distance travelled by the vehicle 202 via a vehicle odometer (not shown). In particular, the odometer may utilize wheel speeds or engine speed to calculate the distance traveled by the vehicle 202. Further, the ECUs 218 may obtain the SOC level from battery sensors installed in the vehicle 202.

In some aspects, the vehicle memory 212 may receive the vehicle operational status determined by the ECUs 218 at a predefined frequency, and store as historical vehicle battery charging information.

In addition, the vehicle memory 212 may receive historical charging station locations used for charging the vehicle 202 from a vehicle navigation unit (not shown), and may store the locations under the historical vehicle battery charging information. In additional aspects, the vehicle memory 212 may store information associated vehicle type, vehicle model, vehicle year of manufacture, vehicle battery type (along with other vehicle component type), vehicle battery year of manufacture, and/or the like.

The vehicle transceiver 216 may be configured to obtain the vehicle operational status, the historical battery charging information, the vehicle and battery type, model, etc. (collectively referred to as "vehicle information") from the vehicle memory 212, and transmit the vehicle information to one or more external systems or servers. For example, the vehicle transceiver 216 may transmit the vehicle information to the server 204 and/or the vehicle charging management system 200 via the network 206.

A person ordinarily skilled in the art may appreciate that the vehicle architecture shown in FIG. 2 may omit certain vehicle units and/or vehicle computing modules. It should be readily understood that the vehicle 202 depicted in FIG. 2 is an example of a possible implementation according to the present disclosure, and thus, it should not be considered limiting or exclusive.

Further, although the description above describes that the vehicle transceiver 216 may obtain the vehicle information from the vehicle memory 212 and transmit the information to one or more external systems (e.g., the vehicle charging management system 200), a person ordinarily skilled in the art may appreciate that some parts of the vehicle information may be obtained from other systems, different from the vehicle 202.

The vehicle charging management system 200 may receive/obtain the vehicle information from the vehicle transceiver 216 and/or the server 204. The vehicle charging management system 200 may include a plurality of units including, but not limited to, a system transceiver 220, one or more system processors 222 (or a system processor 222) and a system memory 224. The system transceiver 220 may be configured to transmit and receive information to and from the vehicle 202, the server 204, via the network 206.

The system processor 222 may be disposed in communication with one or more memory devices, e.g., the system memory 224 and/or one or more external databases (not shown in FIG. 2). The system processor 222 may utilize the system memory 224 to store programs in code and/or to store data for performing various system operations in accordance with the present disclosure. The system memory 224 may be a non-transitory computer-readable memory storing a battery charging management program code. The system memory 224 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

In some aspects, the system memory 224 may include a plurality of modules and databases including, but not limited to, a charging station information database 226, a vehicle information database 228, a user charging pattern database 230, and a user intent prediction module 232. The user intent prediction module 232, as described herein, may be stored in the form of computer-executable instructions, and the system processor 222 may be configured and/or programmed to execute the stored computer-executable instructions for performing vehicle charging management system functions in accordance with the present disclosure.

The charging station information database 226 may store information associated with a plurality of charging stations. In particular, the system transceiver 220 may receive/obtain such information from the server 204 (or any other device). Such information may include, but is not limited to, locations of a plurality of charging stations in a geographical area where the vehicle 202 may be located, real-time charging station availability, charger type (fast charger or regular charger) available at each charging station, and/or the like. In some aspects, the system transceiver 220 may receive the information at a predetermined frequency. For example, the system transceiver 220 may receive the real-time charging station availability every minute or every 5-10 minutes. The system transceiver 220 may receive the remaining information, e.g., charger type, location, etc. once every fortnight or month. Responsive to receiving such information, the system transceiver 220 may send the information to the charging station information database 226 for storage purpose.

The vehicle information database 228 may store the vehicle information that the system transceiver 220 may be receive from the vehicle transceiver 216 and/or the server 204. Specifically, responsive to receiving the vehicle information, the system transceiver 220 may send the vehicle information to the vehicle information database 228 for storage purpose.

In further aspects, the system processor 222 may obtain the vehicle information (mainly the historical vehicle battery charging information) from the vehicle information database 228, and may determine vehicle user charging pattern (user preferences) to charge the vehicle 202 based on the historical vehicle battery charging information. Responsive to determining the user charging pattern, the system processor 222 may send the user charging pattern to the user charging pattern database 230 for storage purpose. The user charging pattern may include a user preferred SOC level at which the user may prefer to charge the vehicle 202, a user preferred distance travelled between charging events, and a user preferred time since last charge at which the user may prefer to charge the vehicle 202. In addition, the user charging pattern may include user preferred chargers (e.g., charger types), charging locations, time and day of charging, and/or the like.

For example, the system processor 222 may analyze the historical SOC levels at which the user generally charges the vehicle 105 and determine a user preferred SOC level for charging (which may be, e.g., 25% or 30%). Further, the system processor 222 may analyze typical distance travelled by the vehicle 202 between two charging events (using the historical battery charging information) and determine the user preferred distance travelled between charging events.

For example, the system processor 222 may determine that the user typically charge the vehicle 202 after travelling 200 miles. Thus, the user preferred distance between charging events may be 200 miles. Similarly, the system processor 222 may determine the user preferred time for charging the vehicle 105 since previous charging event, based on the historical battery charging information. For example, the system processor 222 may determine that the user generally charges the vehicle 105 every 48 hours, irrespective of SOC level and/or distance travelled.

In addition, the system processor 222 may determine the user preference associated with charging station locations based on the historical battery charging information. For example, the system processor 222 may analyze the historical battery charging information and determine that the vehicle user generally prefers to use a charging station that has a coffee shop nearby. In some aspects, the system processor 222 may obtain the user preference associated with charging station locations from an external server that may be associated with a service provider (e.g., a service provider proving navigation map services). In further aspects, the system processor 222 may determine the user preference using unsupervised machine learning techniques that may be applied to incrementally recognize location related factors associated with charging behaviors. Similarly, the system processor 222 may determine a charger type (fast/regular) that the user generally prefers to charge the vehicle 202 with, or day and time at which the user generally charges the vehicle 202. For example, the system processor 222 may determine that the user generally prefers to charge the vehicle 202 over weekends, or while going back to home in the evening. Further, the system processor 222 may determine that the user uses a regular charger over the weekends, but prefers to use a fast charger while going back to home in the evening. Such preferences are also stored in the user charging pattern database 230.

In some aspects, the system processor 222 may use machine learning to determine the vehicle user charging pattern. In particular, the system processor 222 may use adaptive resonance theory (ART) to determine the vehicle user charging pattern. An ART network may generate clusters from a set of input data. The set of input data may include information associated with battery charging events. For example, the set of input data may include information associated with the SOC level (minimal SOC level) at which the vehicle 202 was last charged, distance travelled by the vehicle 202 since last charge, charging station location, charger type used to charge the vehicle 202 in the last charge, etc.

In some aspects, each cluster may be characterized by a mean and a variance from a prototype input representing that cluster. The prototype is generated first, as a copy of the input vector used to create a new cluster. Subsequently, the prototype may be updated as new inputs are mapped to that cluster. Additionally, a cluster may be characterized by how many input vectors have been used to update that cluster, after it is initially created. Typically, the more input vectors that map to a given cluster, the more significant that cluster. Each cluster represents an observed statistical distribution of a particular thing or event being observed by the ART network.

In an exemplary aspect, the system processor 222 may create clusters for SOC levels, distance travelled since last charge, time since last charge, etc. As and when new inputs are received (e.g., when a new charging "event" is detected by the system processor 222) with respect to the SOC level, the distance travelled or time since last charge, the respective clusters are updated.

Responsive to obtaining an event, the system processor 222 may determine whether a detected event matches a cluster. For example, the ART network may receive a vector as an input and either update an existing cluster or create a new cluster. In some aspects, the ART network may analyze clusters with embedded function (i.e., logical regression or survival functions). In further aspects, the system processor 222 may use a decision tree algorithm. The decision tree algorithm may include top-down search that involves partitioning the data (e.g., data included in a plurality of clusters) into subsets that contain instances with similar values (homogenous). The decision tree algorithm may use standard deviation to calculate the homogeneity of a sample. The system processor 222 may form a cluster with homogenous data.

The system processor 222 may be further configured to execute instructions stored in the user intent prediction module 232 to predict a user intent to charge the vehicle 202 based on the vehicle information and the determined vehicle user charging pattern. Responsive to the predicting the user intent, the system processor 222 may provide recommendation or notification to the user to charge the vehicle 202. The process of determining the user intent may be understood as follows.

In operation, the system processor 222 may obtain a first input associated with the vehicle 202. The first input may include the vehicle 202 information such as the battery SOC level, a distance travelled by the vehicle 202 since last charge, and time since the last charge. In particular, the system processor 222 may obtain the first input from the vehicle information database 228.

The system processor 222 may obtain a second input associated with historical vehicle battery charging information from the system memory 224. The system processor 222 may then determine vehicle user charging pattern based on the historical vehicle battery charging information as described above. The vehicle user charging pattern may include a user preferred SOC level, a user preferred distance travelled between charging events, and a user preferred time since last charge. In some aspects, the system processor 222 may obtain the second input at predetermined time durations or when the system processor 222 detects an event associated with vehicle battery charging.

The system processor 222 may determine a vehicle user intent to charge the vehicle 202 based on the first input and the vehicle user charging pattern. For example, the system processor 222 may determine a probability that the user may charge the vehicle 202 based on the vehicle information (e.g., the SOC level) and user preferences to charge the vehicle 202. In particular, the system processor 222 may calculate a first vehicle user intent (first probability) based on the SOC level and the user preferred SOC level. The system processor 222 may further calculate a second vehicle user intent (second probability) based on the distance travelled by the vehicle since last charge and the user preferred distance travelled by the vehicle since last charge. The system processor 222 may further calculate a third vehicle user intent (third probability) based on the time since the last charge and the user preferred time since last charge.

Responsive to calculating the first vehicle user intent, the second vehicle user intent and the third vehicle user intent, the system processor 222 may identify a maximum vehicle user intent from the first vehicle user intent, the second vehicle user intent, and the third vehicle user intent. For example, the system processor 222 may determine that the first vehicle user intent using the SOC level is 75%, the second vehicle user intent using the distance travelled by the vehicle since last charge is 60% and the third vehicle user intent using the time since the last charge is 50%. The system processor 222 may then identify that the maximum vehicle user intent is from the first vehicle user intent (i.e., 75%).

Responsive to determining the maximum vehicle user intent, the system processor 222 may compare the maximum vehicle user intent with a threshold value. The threshold value may be pre-stored in the system memory 224. When the maximum vehicle user intent is greater than threshold value, the system processor 222 may transmit, via the system transceiver 220, a notification to a communication device (such as a vehicle 202 infotainment system, a vehicle 202 audio system, or a user device). The notification may include a request to confirm the vehicle user intent to charge the vehicle 202. For example, if the maximum vehicle user intent is 75% and the threshold value is 70%, then the system processor 222 may confirm with the user whether the user desires to charge the vehicle 202. Responsive to receiving the notification, the user may provide response/feedback on the request and may confirm if the user is interested to charge the vehicle 202. In some aspects, the system transceiver 220 may receive the response/feedback from the user interface when the user confirms (or declines) the request.

The system processor 222 may obtain the response/feedback from the system transceiver 220 and may determine whether the response/feedback is positive or negative (i.e., whether the user is interested in charging the vehicle 202). Responsive to a determination that the response/feedback is positive, the system processor 222 may obtain vehicle user historical driving pattern from the system memory 224 (or from the vehicle memory 212/server 204). In some aspects, the system processor 222 may obtain the vehicle user historical driving pattern even before the response is received from the system transceiver 220. Stated another way, the system processor 222 may obtain the vehicle user historical driving pattern when the system processor 222 determines that the maximum vehicle user intent is greater than the threshold value. In some aspects, the vehicle user historical driving pattern may be stored in the user charging pattern database 230. The vehicle user historical driving pattern may include driving routes, daily activities, destination locations (may be for different times of the day or week), and/or the like.

Responsive to obtaining the historical driving pattern, the system processor 222 may fetch/determine a list of destinations that the user may be driving the vehicle 202 to. Stated another way, the system processor 222 may predict one or more destination locations where the user may be travelling to, based on vehicle user historical driving pattern and a vehicle 202 current location (which may be obtained by the system processor 222 from the vehicle navigation unit). The system processor 222 may then transmit the predicted list of destination locations to the communication device via the system transceiver 220. The vehicle user may view the list on the communication device and may select a destination from the list. Stated another way, the vehicle user may provide response/feedback on the list of destination. The system transceiver 220 may receive the selected destination from the user interface, and the system processor 222 may obtain the selection from the system transceiver 220.

Responsive to obtaining the destination selection, the system processor 222 may identify a charger to charge the vehicle 202. In particular, the system processor 222 may identify the charger based on the response/feedback on the list of destinations, the additional user preferences and information stored in the charging station information database 226. Specifically, the system processor 222 may search a charger that may be located in the vehicle user route to the selected destination. Further, the system processor 222 may search a charger that may be available (free or with minimal waiting time), and may have a coffee shop nearby (if the user preferences indicate that the user prefers a charging station with a coffee shop).

The system processor 222 may transmit information (such as location or charger identifier) associated with the identified charger to the communication device, via the system transceiver 220. The system processor 222 may further receive the response/confirmation from the communication device (i.e., confirmation from the user whether the user is interested in charging the vehicle 202 at the identified charger), via the system transceiver 220. Based on the response/confirmation, the system processor 222 may reserve the identified charger for the user. Specifically, the system processor 222 may send a reservation notification to the charging station (e.g., to a charging station server), via the system transceiver 220, to reserve the identified charge for the user. In additional aspects, the reservation notification may include expected arrival time at the charging station, so that the charging station may reserve the identified charger at the expected arrival time.

In further aspects, the system processor 222 may use the navigation unit to navigate the vehicle 202 to the location of the identified charger. For example, the system processor 222 may use pre-stored map information (that may be stored in the system memory 224) or receive map information from an external server (e.g., a navigation server) to provide navigation instructions, via the vehicle 202 infotainment system or the user device, to the user to navigate the vehicle 202 to the charger location. If the vehicle 202 is an autonomous vehicle, the system processor 222 may transmit the navigation instructions to the DAT controller 214.

In further aspects, when the system processor 222 determines that the maximum vehicle user intent is less than the threshold value and when the vehicle user may be approaching a preferred charging location (that may be frequently used by the vehicle user), the system processor 222 may predict a "future vehicle user intent" to charge the vehicle 202. The future vehicle user intent may be an expected vehicle user intent to charge the vehicle 202 in the future (e.g., after 24 hours). The system processor 222 may determine the future vehicle user intent based on the first input and the second input. For example, if the SOC level is 70% but the system processor 222 determines that the vehicle user may have to travel a long distance after two days (e.g., based on vehicle user driving pattern), the system processor 222 may determine that the future vehicle user intent may be high (e.g., 90% or more). The system processor 222 may then compare the future vehicle user intent with another threshold value. When the future vehicle user intent is greater than the other threshold value, the system processor 222 may transmit another notification to the user interface to charge the vehicle 202. The other notification may include a reminder to the user to charge the vehicle 202.

Figure 3:
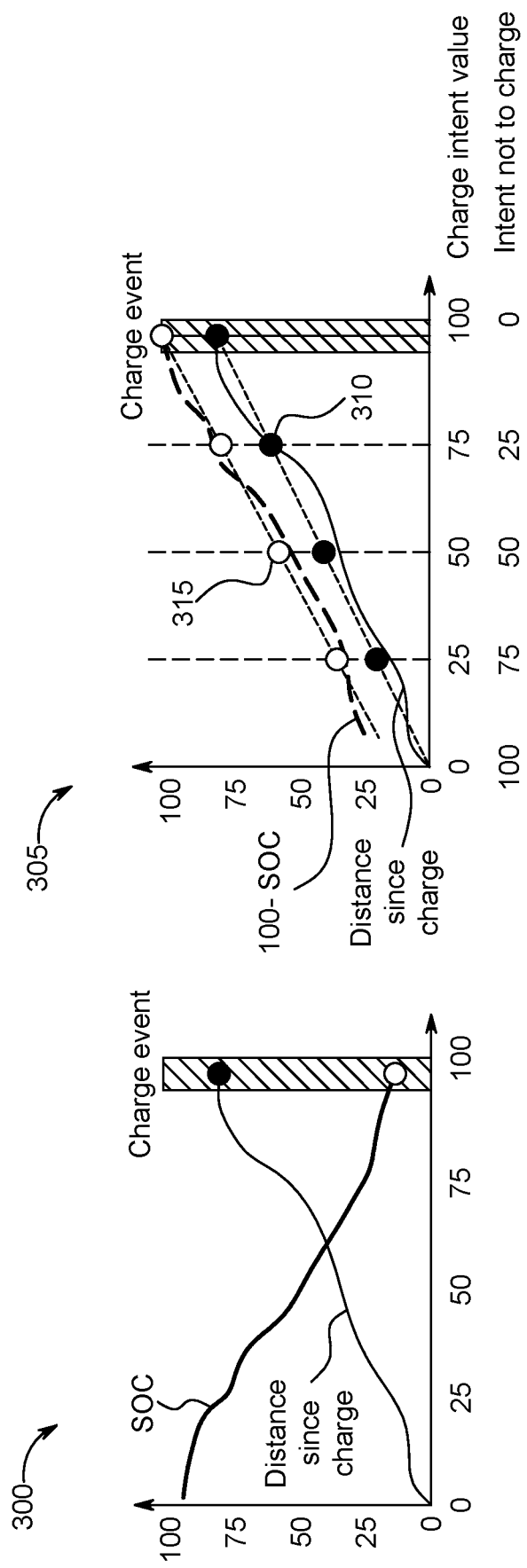
FIG. 3 depicts an exemplary graph indicative of vehicle user charging intent in accordance with the present disclosure.

FIG. 3 depicts an exemplary graph 300 indicative of vehicle user charging intent in accordance with the present disclosure. As described in conjunction with FIG. 2, the system processor 222 may determine the vehicle user charging pattern using the historical vehicle battery charging information. In addition, the system processor 222 may determine the vehicle user charging intent based on the vehicle user charging pattern and the vehicle information (SOC level information, distance travelled by the vehicle 105 since last charge, time elapsed since last charge etc.).

In some aspects, the X-axis of the graph 300 may represent vehicle user charging intent and the Y-axis may represent the SOC level or distance travelled since the last charge (as historical data for a user). In some aspects, the Y-axis may represent the SOC level or the distance travelled which is normalized to a same scale (e.g., from 0-100 units). In particular, the graph 300 illustrates that when the user charges the vehicle 202, the SOC level may be high (e.g., close to 100% or 100 units) and the distance travelled since last charge may be zero. At this point, the user intention to charge the vehicle may be close to 0%. As the vehicle moves, the SOC level may monotonically decrease and the distance travelled since last charge (and/or time since the last charge, not shown) may monotonically increase.

In some aspects, the system processor 222 may convert the SOC level as depicted in the graph 300 to "100 unit-SOC level" and convert the graph 300 to a graph 305. The Y-axis of the graph 305 may represent the 100-normalized SOC level or distance travelled since the last charge (as learning and prediction horizon), and the X-axis of the graph 305 may represent user charging intent value (as survival value). The converted data may have intermediate points calculated using linear interpolation method.

As discussed above, the system processor 222 may calculate the user charging intent based on each input. For example, the system processor 222 may calculate user charging intent based on each of the 100-normalized SOC level, distance travelled since last charge, time elapsed since last charge. For example, at time T=0, the user may have charged the vehicle 202, and at time T=T1, the vehicle 202 may have travelled a first distance (e.g., 100 miles) and may be at point 310. At the same time (T=T1), the vehicle 202 may have an SOC level indicated at point 315. At this time (T=T1), the system processor 222 may determine that the intent to charge the vehicle 202 for the user based on 100-normalized SOC level at 315 may be 50%. Similarly, the system processor 222 may determine that the intent to charge the vehicle 202 for the user based on the distance travelled since the last charge at 310 may be 75%. This may be because the vehicle 202 may be on a route that may require relatively less battery power (e.g., when the vehicle 202 is driving downhill). The system processor 222 may then identify a maximum vehicle user charge intent from the intent identified using the 100-SOC level (e.g., at 315) and using the distance travelled since last charge (e.g., at 310). For example, the system processor 222 may identify the maximum intent at this time is 75%. The system processor 222 may then compare the maximum intent with the threshold value (which may be 90%), and transmit notification to the user when the maximum intent is greater than the threshold value.

In further aspects, the system processor 222 may calculate an average vehicle user intent based on all the calculated intent (determined based on SOC value, distance travelled since last charge, time elapsed since last charge etc.), and may use the average vehicle user intent to calculate the final vehicle user intent.

Figure 4:
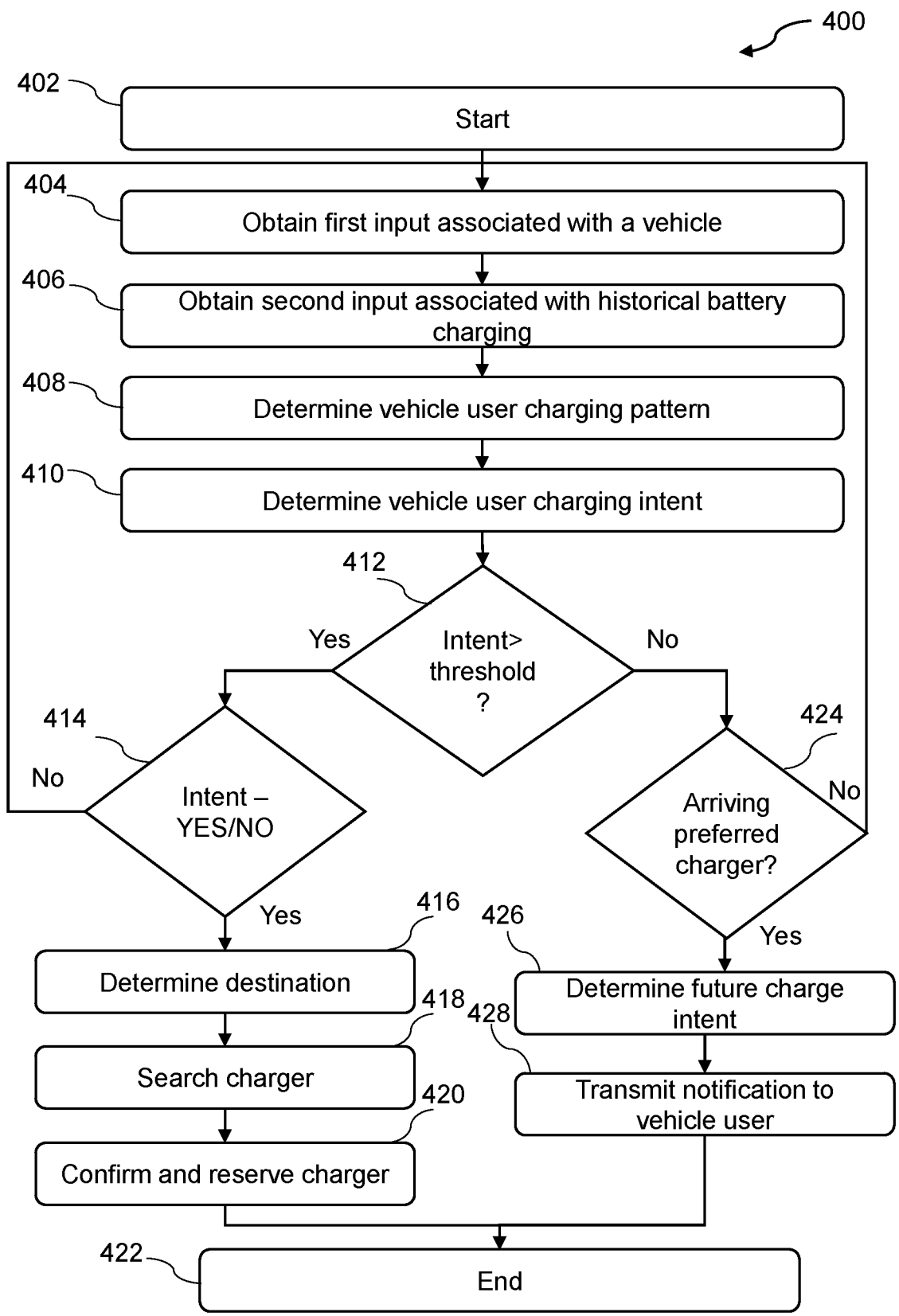
FIG. 4 depicts a flow diagram of an example vehicle charging management method in accordance with the present disclosure.

FIG. 4 depicts a flow diagram of an example vehicle charging management method 400 in accordance with the present disclosure. FIG. 4 may be described with continued reference to prior figures, including FIGS. 1-3. The following process is exemplary and not confined to the steps described hereafter. Moreover, alternative embodiments may include more or less steps that are shown or described herein and may include these steps in a different order than the order described in the following example embodiments.

The method 400 starts at step 402. At step 404, the method 400 may include obtaining, by the system processor 222, a first input associated with a vehicle. The first input may include a state of charge (SOC) level of a vehicle battery, a distance travelled by the vehicle 202 since last charge, and time elapsed since the last charge. In some aspects, the system processor 222 may obtain the first input from the vehicle information database 228.

At step 406, the method 400 may include obtaining, by the system processor 222, a second input associated with historical vehicle battery charging information. The historical vehicle battery charging information may include last battery charge time/day, SOC level at which the vehicle 105 was last charged, time for which the battery was last charged (e.g., 30 minutes or 15 minutes), charger type used (e.g., fast charger or regular charger), etc. In some aspects, the system processor 222 may obtain the second input from the vehicle information database 228.

At step 408, the method 400 may include determining, by the system processor 222, vehicle user charging pattern based on the second input. The vehicle user charging pattern may include a user preferred SOC level, a user preferred distance travelled between charging events, and a user preferred time since the last charge. The details of determining the vehicle user charging pattern are already described above in conjunction with FIG. 2. At step 410, the method 400 may include determining/predicting, by the system processor 222, a vehicle user charging intent based on the first input and the vehicle user charging pattern.

At step 412, the method 400 may include determining, by the system processor 222, whether the user charging intent is greater than a threshold value. Responsive to a determination that the user charging intent is greater than the threshold value, the method 400 may move to step 414. At step 414, the system processor 222 may confirm the vehicle user charging intent with the vehicle user. Specifically, the system processor 222 may transmit a notification to a communication device (such as a user device, a vehicle audio system, a vehicle infotainment system, etc.), which may include a request to confirm the vehicle user charging intent. The system processor 222 may receive a response/feedback from the user.

Responsive to a receiving a positive feedback/confirmation on the request, the method 400 may move to step 416. At step 416, the system processor 222 may predict/determine a destination the vehicle user may be travelling to. Specifically, the system processor 222 may obtain vehicle user driving pattern from the system memory 224 and predict a list of destinations based on the vehicle user driving pattern. The system processor 222 may transmit the list of destinations to the communication device to receive input from the user on the list of destinations. Stated another way, the system processor 222 may receive selection of a destination from the vehicle user. In further aspects, responsive to a receiving a negative feedback/confirmation on the request, the method 400 may move back to step 404.

At step 418, the method 400 may include identifying/searching a charger based on the user's selection of the destination, user preferences (associated with a charger type, day and time to charge the vehicle battery, or charging station locations), charger availability, etc. For example, the system processor 222 may identify a charger that may be in a vehicle route to the destination. In some aspects, when the user does not select a destination, the system processor 222 may identify any charger in proximity to the vehicle 202.

In some aspects, the system processor 222 may perform the steps 416 and 418 in parallel to performing the step 414. Stated another way, the system processor 222 may initiate the process of determining the destination and searching for the charger, while the system processor 222 awaits a response from the vehicle user.

Responsive to identifying the charger, the method 400 may move to step 420. At step 420, the system processor 222 may confirm and reserve the charger, as described above. In additional aspects, the system processor 222 may navigate the vehicle 202 to a location associated with the charger. The method 400 may end at step 422.

In further aspects, when the system processor 222 determines that the vehicle user charging intent is less than the threshold value at the step 412, the method 400 may move to step 424. At step 424, the system processor 222 may determine whether the vehicle 202 is approaching a user preferred charger or the vehicle 202 is in proximity to a user preferred charger. Responsive to a determination that the vehicle 202 is approaching or is in proximity to the preferred charger, the method may move to step 426. At step 426, the system processor 222 may determine future vehicle user charging intent, as described above. When the system processor 222 determines that the future vehicle user charging intent is greater than a second threshold value (that may be same or different from the threshold value), the method may move to step 428. At step 428, the method 400 may include transmitting a notification/reminder to the vehicle user (specifically to the communication device) to charge the vehicle 202. In further aspects, when the system processor 222 determines that the user is not approaching the preferred charger at the step 424, the system processor 222 may move back to step 404.

The method 400 may end at step 422.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle charging management method comprising:
obtaining, by a processor, a first input associated with a vehicle, wherein the first input comprises a state of charge (SOC) level of a vehicle battery, a distance travelled by the vehicle since last charge, and time since the last charge;
obtaining, by the processor, a second input associated with historical vehicle battery charging information;
determining vehicle user charging pattern based on the historical vehicle battery charging information, wherein the vehicle user charging pattern comprises a user preferred SOC level, a user preferred distance travelled between charging events, and a user preferred time since the last charge;
calculating a first vehicle user intent based on the SOC level and the user preferred SOC level;
calculating a second vehicle user intent based on the distance travelled by the vehicle since the last charge and the user preferred distance travelled between charging events;
calculating a third vehicle user intent based on the time since the last charge and the user preferred time since the last charge;
identifying a maximum vehicle user intent from the first vehicle user intent, the second vehicle user intent, and the third vehicle user intent;
determining, by the processor, a final vehicle user intent to charge the vehicle battery based on the maximum vehicle user intent;
comparing, by the processor, the maximum vehicle user intent with a threshold value;
determining that the maximum vehicle user intent is greater than the threshold value;
transmitting, by the processor, a notification to a communication device; and
autonomously driving, by the vehicle, to a location of a charging station based on the maximum vehicle user intent being greater than the threshold.

2. The vehicle charging management method of claim 1, wherein transmitting the notification to the communication device comprises transmitting a request to confirm the final vehicle user intent.

3. The vehicle charging management method of claim 2 further comprising receiving a first user feedback on the request from the communication device.

4. The vehicle charging management method of claim 3 further comprising:
determining whether the first user feedback is positive or negative;
obtaining vehicle user historical driving pattern based on a determination that the first user feedback is positive;
determining a list of destinations based on the vehicle user historical driving pattern;
transmitting the list of destinations to the communication device; and
receiving a second user feedback on the list of destinations, wherein the second user feedback comprises a user selection of a destination from the list of destinations.

5. The vehicle charging management method of claim 4 further comprising:
identifying a charger based on the second user feedback, user preferred chargers, and charger availability information;
transmitting information associated with the charger to the communication device;
receiving a confirmation on the charger from the communication device; and
reserving the charger for a vehicle user.

6. The vehicle charging management method of claim 5 further comprising navigating the vehicle to a charger location.

7. The vehicle charging management method of claim 1 further comprising obtaining additional user preferences that are associated with a charger type, day and time to charge the vehicle battery, or charging station locations.

8. The vehicle charging management method of claim 7 further comprising:
determining whether the vehicle is in proximity to a vehicle user preferred charging location based on the additional user preferences, when the maximum vehicle user intent is less than the threshold value;
determining a future charging intent based on the first input and the second input when the vehicle user is in proximity to the vehicle user preferred charging location;
comparing the future charging intent with a second threshold; and
transmitting a second notification to the communication device to charge the vehicle battery based on a determination that the future charging intent is greater than the second threshold.

9. A vehicle charging management system comprising:
a transceiver configured to:
receive a first input associated with a vehicle, wherein the first input comprises a state of charge (SOC) level of a vehicle battery, a distance travelled by the vehicle since last charge, and time since the last charge; and
receive a second input associated with historical vehicle battery charging information;
a processor communicatively coupled to the transceiver; and
a memory for storing executable instructions, the processor configured to execute the instructions to:
obtain the first input and the second input from the transceiver;
determine vehicle user charging pattern based on the historical vehicle battery charging information, wherein the vehicle user charging pattern comprises a user preferred SOC level, a user preferred distance travelled between charging events, and a user preferred time since the last charge;
calculate a first vehicle user intent based on the SOC level and the user preferred SOC level;
calculate a second vehicle user intent based on the distance travelled by the vehicle since the last charge and the user preferred distance travelled between charging events;
calculate a third vehicle user intent based on the time since the last charge and the user preferred time since the last charge;
identify a maximum vehicle user intent from the first vehicle user intent, the second vehicle user intent, and the third vehicle user intent;
determine a final vehicle user intent to charge the vehicle battery based on the maximum vehicle user intent; and
compare the maximum vehicle user intent with a threshold value,
wherein the transceiver is configured to transmit a notification to a communication device when the maximum vehicle user intent is greater than the threshold value, and
wherein the vehicle is configured to autonomously drive to a location of a charging station based on the maximum vehicle user intent being greater than the threshold.

10. The vehicle charging management system of claim 9, wherein the notification comprises a request to confirm the final vehicle user intent.

11. The vehicle charging management system of claim 10, wherein the transceiver is further configured to receive a first user feedback on the request from the communication device.

12. The vehicle charging management system of claim 9, wherein the processor is further configured to obtain additional user preferences that are associated with a charger type, day and time to charge the vehicle battery, or charging station locations.

13. A non-transitory computer-readable storage medium having instructions stored thereupon which, when executed by a processor, cause the processor to:
- obtain a first input associated with a vehicle, wherein the first input comprises a state of charge (SOC) level of a vehicle battery, a distance travelled by the vehicle since last charge, and time since the last charge;
- obtain a second input associated with historical vehicle battery charging information;
- determine vehicle user charging pattern based on the historical vehicle battery charging information, wherein the vehicle user charging pattern comprises a user preferred SOC level, a user preferred distance travelled between charging events, and a user preferred time since the last charge;
- calculate a first vehicle user intent based on the SOC level and the user preferred SOC level;
- calculate a second vehicle user intent based on the distance travelled by the vehicle since the last charge and the user preferred distance travelled between charging events;
- calculate a third vehicle user intent based on the time since the last charge and the user preferred time since the last charge;
- identify a maximum vehicle user intent from the first vehicle user intent, the second vehicle user intent, and the third vehicle user intent;
- determine a final vehicle user intent to charge the vehicle battery based on the maximum vehicle user intent;
- compare the maximum vehicle user intent with a threshold value;
- transmit a notification to a communication device when the maximum vehicle user intent is greater than the threshold value; and
- autonomously drive, by the vehicle, to a location of a charging station based on the maximum vehicle user intent being greater than the threshold.

* * * * *